(12) United States Patent
Blaise et al.

(10) Patent No.: US 8,275,532 B2
(45) Date of Patent: Sep. 25, 2012

(54) ANTI-SKID DEVICE FOR THE DRIVING WHEELS OF A VEHICLE AND METHOD FOR REALISING THE SAME

(75) Inventors: Philippe Blaise, Dampierre les Bois (FR); Emmanuel Charpin, Etupes (FR); Damien Joucgnoux, Drancy (FR)

(73) Assignees: Peugeot Citroen Automobiles SA, Velizy Villacoublay (FR); Robert Bosch GmbH, Stuttgart (DE)

( * ) Notice: Subject to any disclaimer, the term of this patent is extended or adjusted under 35 U.S.C. 154(b) by 414 days.

(21) Appl. No.: 12/377,744

(22) PCT Filed: Aug. 10, 2007

(86) PCT No.: PCT/EP2007/058331
§ 371 (c)(1),
(2), (4) Date: Dec. 15, 2009

(87) PCT Pub. No.: WO2008/022935
PCT Pub. Date: Feb. 28, 2008

(65) Prior Publication Data
US 2010/0094521 A1 Apr. 15, 2010

(30) Foreign Application Priority Data
Aug. 18, 2006 (FR) ...................... 06 07392

(51) Int. Cl.
*B60T 7/12* (2006.01)
(52) U.S. Cl. .......................................... 701/90
(58) Field of Classification Search .................. 701/90
See application file for complete search history.

(56) References Cited

U.S. PATENT DOCUMENTS

| 4,999,778 | A | | 3/1991 | Ruhl et al. |
| 5,803,197 | A | * | 9/1998 | Hara et al. ................ 180/248 |
| 5,978,726 | A | * | 11/1999 | Takeda et al. ................ 701/84 |
| 5,980,000 | A | | 11/1999 | Kolbe et al. |
| 6,012,782 | A | * | 1/2000 | Takahira et al. ............ 303/112 |

(Continued)

FOREIGN PATENT DOCUMENTS

DE 4421565 A1 12/1995

(Continued)

OTHER PUBLICATIONS

International Search Report mailed Feb. 11, 2007 in PCT/EPR2007/058331.

*Primary Examiner* — James P Trammell
*Assistant Examiner* — Truc M Do
(74) *Attorney, Agent, or Firm* — Nicolas E. Seckel (57) ABSTRACT

An anti-skid device for the driving wheels (10) of a vehicle, in particular an automotive vehicle, includes an active braking device (16) of the torque to be transmitted to the driving wheels; a torque regulator (12) providing a control signal (Cb) to the active braking device (16) according to information on the regulation deviations (Δv) relative to a set predetermined regulation; a control unit (20) providing the regulator (12) with regulation initialization information (In). The control unit (20) obtains the regulation initialization information (In) from evolution parameters of the vehicle on all terrains, such as the adhesion and the speed of the driving wheels, the slope and/or slant of the terrain. Application: anti-skid device for the wheels of an automotive vehicle.

14 Claims, 5 Drawing Sheets

U.S. PATENT DOCUMENTS

| | | | |
|---|---|---|---|
| 6,026,343 A * | 2/2000 | Ogino | 701/72 |
| 6,360,150 B1 * | 3/2002 | Fukushima et al. | 701/41 |
| 6,494,282 B1 | 12/2002 | Hessmert et al. | |
| 7,070,247 B2 * | 7/2006 | Offerle | 303/146 |
| 7,308,350 B2 * | 12/2007 | Brown et al. | 701/70 |
| 2001/0003805 A1 | 6/2001 | Koibuchi | |
| 2002/0147532 A1 * | 10/2002 | Inagaki et al. | 701/41 |
| 2003/0216850 A1 * | 11/2003 | Trefzer et al. | 701/82 |
| 2006/0076828 A1 * | 4/2006 | Lu et al. | 303/146 |

FOREIGN PATENT DOCUMENTS

| | | |
|---|---|---|
| DE | 19844467 A1 | 4/1999 |
| DE | 19933087 A1 | 1/2001 |
| FR | 2624070 A1 | 6/1989 |

* cited by examiner

ANTI-SKID DEVICE FOR THE DRIVING WHEELS OF A VEHICLE AND METHOD FOR REALISING THE SAME

The present invention relates to an anti-slip system for the drive wheels of motor vehicles, which is also designated by the acronym "ASR" for "Anti Slip Regulation" or "Anti Schlupf Regelung".

It relates more particularly to an improved anti-slip device for the drive wheels and a method for its use.

ASR systems are particularly intended for improving motive performance for driving a motor vehicle on all terrain types.

With ASR systems, the motive power of a wheel is controlled for various vehicle driving situations: in particular, in forward or reverse drive on roads or routes with muddy sections, grass, ruts, quagmires (all-road driving), sand, snow or ice, and for various degrees of slope and slant of the ground over which the vehicle is traveling.

Improved motive power is obtained by these systems within the limits of physics: in particular, the available adhesion of the wheels on the road, the unevenness of the terrain under the vehicle, and the vehicle road clearance.

ASR systems are potentially applicable in any vehicle with two drive wheels (4×2) or four drive wheels (4×4) and, with antilock wheels, or "ABS", the acronym for "Antilock Braking System" in English, they are becoming increasingly associated with dynamic stability control systems—also designated by the acronym "ESP" for "Electronic Stability Program" or "Elektronisches Stabilität Programm"—which additionally enable yaw velocity control of the vehicle.

All of these systems make it possible to significantly enhance vehicle passenger safety and motive performance.

Anti-slip devices also provide valuable help to both novice drivers and experienced drivers.

Figure 1:
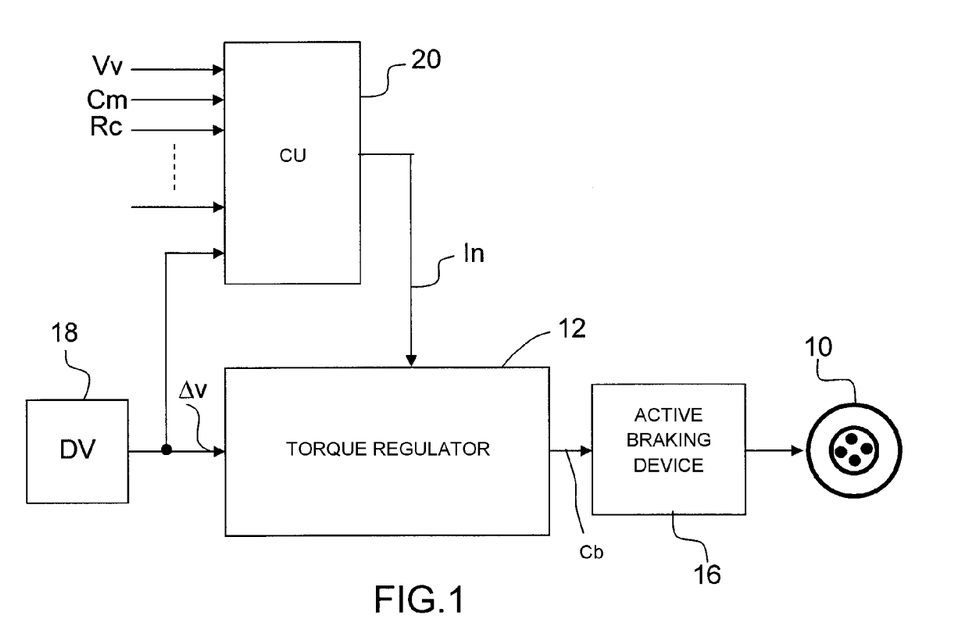
FIG. 1, already described, shows a basic block diagram of a state-of-the-art ASR system.

FIG. 1 shows a basic block diagram of a state-of-the-art ASR system.

The ASR system in FIG. 1 comprises in particular:
- a torque regulator 12 that provides control information Cb to an active braking device 16 that acts on a drive wheel 10;
- a control unit 20 that provides regulation initialization information In to the torque regulator 12; and
- a DV detector 18 that provides the torque regulator 12 with information on deviations in the driving variables Δv of the vehicle.

The control unit 20 receives various types of information about the vehicle at a particular instant, such as the vehicle speed Vv, adhesion Rc, engine torque Cm, etc., and provides the initialization information In to the torque regulator 12.

The torque regulator 12 usually has a proportional regulator that provides control information to the active braking device 16, in proportion to the deviations in the variables, and a control integrator that receives the initialization information from the control unit 20. The proportional regulator and the control integrator are embodied by means of software components that implement processing algorithms for each of the drive wheels 10 of the vehicle, respectively.

The vehicle additionally has sensors (not shown in FIG. 1) that provide information to the control unit 20.

State-of-the-art ASR systems of this kind are currently provided in all-wheel drive vehicles (4×4), but they suffer from defects and inadequacies. In order to highlight these inadequacies, we will consider various situations in which the automobile is traveling over the terrain, which we will henceforth call "scenarios".

Hereinafter we will also use the term "start-off" to designate the transition from a situation where the vehicle is stopped (zero speed) to a situation in which the vehicle moves off (non-zero speed).

A vehicle can travel over two main categories of terrain:
- low-adhesion terrain, e.g., with sand, gravel, snow, ice;
- high-adhesion terrain, like wet or dry asphalt drives or roads.

We will discuss the following two main types of scenarios A and B:

A—First type of scenario on vehicle travel surfaces with low or high adhesion:
- starting the vehicle off on the level on uniform or non-uniform low, medium and high adhesion;
- starting off on a slope and/or a slant on low, medium and high adhesion;
- starting off on a slope and/or a slant on uniform or non-uniform low, medium and high adhesion, with wheels turned.

Operating in this first type of scenario A, state-of-the-art ASR systems produce immediate engine and brake control to bring both (4×2) or all four (4×4) wheels of the vehicle back to a fixed setting, no matter what the adhesion, slope and/or slant of the surface is.

The impact on the vehicle, which is felt by the driver, is the following:
- with low adhesion, there is a lack of motive power, and the vehicle is difficult to control;
- with high adhesion, there is a significant engine cut-out, hampering the start-off speed.

B—Second type of scenario on low-adhesion vehicle travel surfaces:
- vehicle progress over sloping and/or slanted terrain on uniform or non-uniform low or medium adhesion.

Currently, operating in this second type of scenario B, state-of-the-art ASR systems regulate the torque transmitted to both (4×2) or all four (4×4) wheels near a low, fixed setting that can be increased when, for example, deep snow is detected, thereby ensuring robust detection.

The impact on the vehicle, which is felt by the driver, is the following:
- with low adhesion, there is a lack of motive power, and a sense of frustration for the vehicle driver;
- in mud, depending on the moisture level, the tire structure can fill up with mud and no longer provide the available adhesion.

One of the main objectives of the invention is to obtain better control of the vehicle through the continuous pursuit of motive power on any kind of surface or terrain.

Another objective of the invention is to make driving a vehicle safer and easier, especially for those with little experience in all-terrain driving.

To this end, and in order to remedy the disadvantages of state-of-the-art systems, the invention proposes an anti-slip device for the drive wheels of a vehicle, a motor vehicle in particular, comprising:
- an active braking device for the drive wheels;
- a torque regulator that provides a control signal (Cb) to the active braking device as a function of information on regulation deviations (Δv) with respect to a specified regulation setting;
- a control unit that provides the torque regulator with a regulation initialization information (In);
- means for providing the regulation initialization information (In) based on all-terrain travel parameters for the vehicle, such as adhesion and drive wheel speed, terrain slope and/or slant;

means for providing the regulation initialization information (In) based on information about action taken by the driver on one or more vehicle control elements, characterized in that the torque regulator has means for selecting a first drive wheel to brake (called the slow wheel) during a vehicle start phase in order to obtain motive power, while at least one other drive wheel participating in the traction of the vehicle is not braked in order to increase its road adhesion.

In one embodiment, the first drive wheel, which is braked, and the other drive wheel, which is unbraked, are respectively located at the free ends of the same axle.

In another embodiment, the first drive wheel, which is braked, and the other drive wheel, which is unbraked, are steered wheels.

In another embodiment, the torque regulator has means for determining the best possible acceleration (optimized acceleration) as a function of vehicle travel parameters and information about driver action on one or more vehicle control elements.

The invention also relates to a method for using the device described above.

The method is characterized in that it includes the following steps:
  having the torque regulator provide a torque distributor control signal as a function of information on regulation deviations with respect to a wheel speed regulation setting;
  having the control unit provide a regulation initialization information based on parameters for vehicle travel on the road, such as adhesion and wheel speed, terrain slope and/or slant.

Advantageously, the step in which the regulation initialization information is provided is also based on information about action taken by the driver on vehicle control elements, which reveals driver intentions.

In one embodiment, the method according to the invention comprises at least:
  an analysis/evaluation phase (Phase 0) for adhesion, drive wheel speed, terrain slope and/or slant, and driver intentions;
  a vehicle start (start-off) phase (Phase 1) consisting in selecting a first drive wheel to brake—or slow wheel—in order to have drive power, with at least one other drive wheel that participates in traction being unbraked in order to eject foreign bodies reducing the adhesion of said wheel and use the rotational speed of this wheel to dig into the ground and reestablish adhesion and thus motive power;
  a travel phase (Phase 3) comprising:
  a decrease in the speed control setting—initially high during wheel slip—in order to get the best possible acceleration,
  determination of the target acceleration the driver wants for the vehicle, and controlling near this acceleration point.

Slip (or slip rate) is generally understood to be the rate of wheel slip relative to the vehicle speed.

In one embodiment of the method in which the relevant drive wheels are steered wheels located on the same axle, with no slope and/or slant and when the wheels are straight or at a turning angle $\alpha$ less than a preset value $\alpha b$ ($\alpha \leq \alpha b$), the wheel with the lowest speed is considered to be the slowest wheel (RI0).

In another embodiment of the method, in which the relevant drive wheels are steered wheels located on the same axle, with no slope and/or slant, and when the wheels are turned beyond a certain turning angle ($\alpha > \alpha b$), the outer wheel (Rext) is selected as the slow wheel in order to avoid generating more understeer, the outer wheel being the wheel furthest from the theoretical pivot point of the vehicle.

In another embodiment, in which the relevant drive wheels are steered wheels located on the same axle, and in the presence of a slope and/or slant: with AX as longitudinal acceleration along a longitudinal axis X of the vehicle and AY as acceleration along an axis Y perpendicular to the axis X, with AX and AY able to take positive or negative values, the method has a step for calculating the sign of the product AX*AY and determining the slow wheel:
  if the product AX*AY is positive, the right wheel Wri is selected as the slow wheel (W slow=Wri),
  if the product AX*AY is negative, the left wheel Wle is selected as the slow wheel (W slow=Wle), with a change in the wheel being possible only if:
  the sign of the product (AX*AY) is reversed.
  a wheel stability criterion is not met.
  Then the slow wheel and the fast wheel are reversed.

The traction control device according to the invention is configured so as to provide new capabilities compared to the state-of-the-art anti-slip device, in particular:
  implementing specific control laws for managing vehicle scenarios in four phases: Phase 0, Phase 1, Phase 2 and Phase 3, with phase 2 being a transitional phase;
  implementing specific control laws for managing the slip rate, with the driver's intention taken into account.

The invention will be more easily understood in light of examples of embodiments of the device according to the invention, with reference to the indexed drawings in which.

The following description is based on an example of a vehicle with two drive wheels (4×2).

However, the invention is not limited only to two-wheel drive vehicles (4×2), but is also applicable to four-wheel drive vehicles (4×4).

Figure 2:
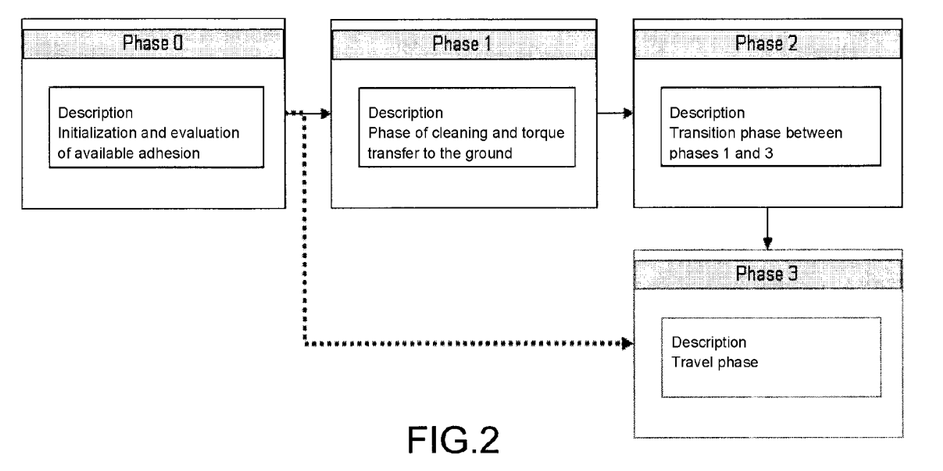
FIG. 2 shows a block diagram of various phases of the anti-slip method according to the invention.

FIG. 2 shows a flow chart of the three phases—Phase 0, Phase 1, Phase 2 and Phase 3—of the new capabilities of the method according to the invention, and the interlinking between each of the phases.

Phase 0 is a phase for analyzing/evaluating wheel speed and road adhesion, terrain slope and/or slant, and driver intentions;

Phase 1 is a vehicle start (or start-off) phase. It results in selecting a wheel that must be braked in order to have motive power by making maximum use of the available adhesion and sending torque to the ground via this wheel (the slowest possible wheel speed will be selected, with no slip, i.e., the slow wheel is going at the speed of the vehicle), without braking the other wheel.

The main objectives of this phase 1 are:
- to clear mud from the tire of the fast wheel so that the tire can regain adhesion;
- to use the rotational speed of this wheel to dig into the ground and regain adhesion; and
- to transmit torque with the slow wheel by adhesion.

Phase 2 is a transition phase between phase 1 and phase 3.

Phase 3 is a travel phase that consists in:
- reducing the setpoint speed, which is initially high during wheel slip, in order to gain the best possible acceleration;
- and when this is achieved, determining the target acceleration that the driver wants; and
- controlling the speed near this point.

If the driver accelerates, the setpoint speed is increased in order to find the best acceleration.

If the driver eases up on the accelerator pedal while remaining in ASR mode, the setpoint speed is reduced in order to once again find the best acceleration.

In an ideal case in which the vehicle starts with equal wheel adhesion and obtains the acceleration that the driver wants, the method according to the invention goes directly from phase 0 to the vehicle travel phase 3.

In the following, we will describe the phases of the method according to the invention in response to various scenarios.

Figure 3:
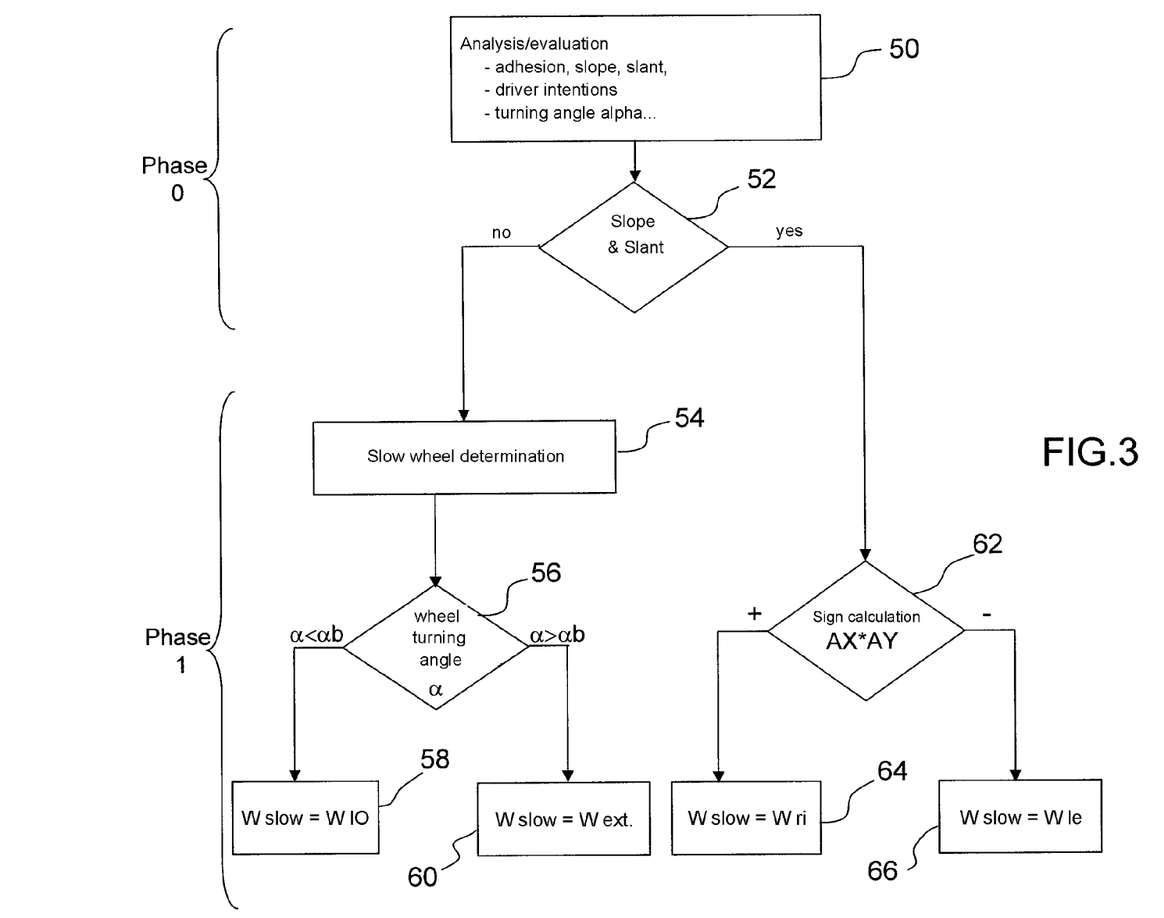
FIG. 3 shows a flow chart of the phases of the method for using the device according to the invention.

FIG. 3 shows a flow chart of the various phases of the method according to the invention:

In phase 0, the method has a step 50 for analyzing/evaluating vehicle driving conditions followed by a step 52 for determining the presence or absence of slope and/or slant on the terrain.

In a known manner, accelerometers sensitive to longitudinal, transverse and yaw accelerations of the vehicle and other detectors for slope are used to determine the slope and/or slant status of the terrain over which the vehicle is traveling.

Also in a known manner, wheel speed sensors associated with the wheels make it possible to determine which wheel has the lowest speed.

In phase 1, the way the method determines the slow wheel depends on whether a slope and/or slant is ("yes") or is not ("no") present.

Two scenarios A and B are then distinguished:

In scenario A, if the result is "no" (no slope or slant is present), then this is the first scenario for determining the slow wheel (step 54).

In this case, the determination method 54 has a step for determining the turning angle α (step 56) of the wheels with two conditions 1 and 2:

1—when the wheels are straight or at a turning angle α less than a preset value αb ($\alpha \leq \alpha b$), the lowest speed (or slowest) wheel WIO determined in the analysis/evaluation phase 0 (step 50) is considered to be the slowest wheel (W slow=WIO) (step 58), in phase 1, for two reasons:
- this wheel is capable of transferring torque to the ground;
- the fast wheel is highly likely to have already dug into the ground, and will therefore have to apply additional torque in order to overcome the obstacle created from digging into the ground.

2—when the wheels are turned beyond a set turning angle ($\alpha > \alpha b$), the outer wheel Wext (W slow=Wext) 60 is selected as the slow wheel so as to avoid generating more understeer.

The outer wheel is considered to be the wheel furthest from the theoretical pivot point of the vehicle.

Figure 4:
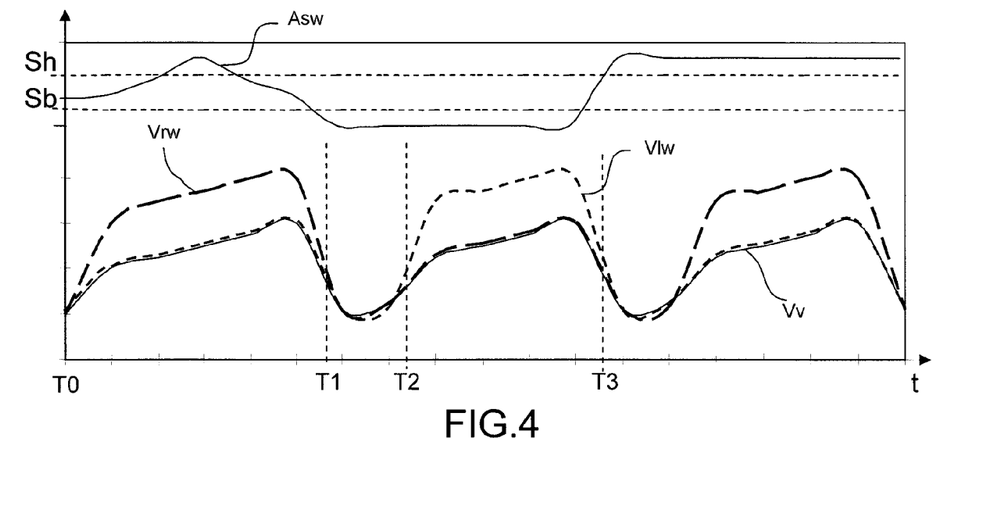
FIG. 4 shows the change over time in the speeds of the right and left wheels, along with the vehicle speed, as a function of the driver-actuated steering wheel angle.

FIG. 4 shows the change over time in the speeds of the right Vrw and left Vlw wheels, along with the vehicle speed Vv, as a function of the driver-actuated steering wheel angle Asw (turning angle).

When the steering wheel is turned to the left (above the upper αb threshold Sh), the right wheel Vrw is faster than the slower left wheel Vlw (time T0-T1). Then when the steering wheel is turned from left to right (below the lower αb threshold Sb), the left wheel Vlw becomes faster than the right wheel Vrw (time T2-T3), going through a transitional time period (T1-T2) where the two wheels are at substantially the same speed. The vehicle speed decreases temporarily during this transitional period (T1-T2).

Figure 5:
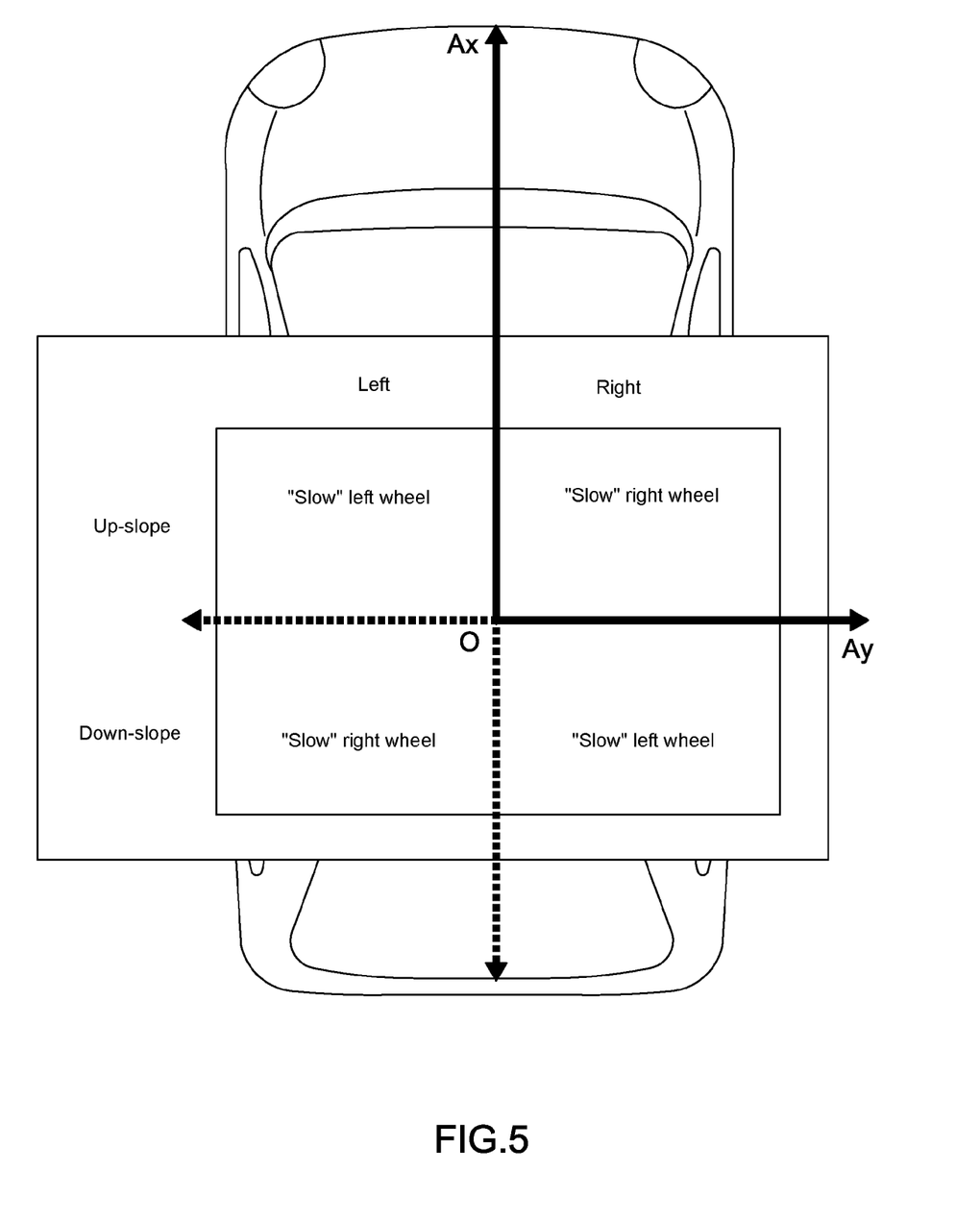
FIG. 5 shows a table for selecting the slow wheel in the method according to the invention when there is a slope and/or slant.

In scenario B, which corresponds to selecting the slow wheel in situations where a slope and/or slant is present:

If the result of step 52 is "yes" (see FIG. 3), the method has a step to calculate the sign 62 of the product AX*AY and determine the slow wheel:

where AX is the longitudinal acceleration along a longitudinal axis X of the vehicle and AY is the acceleration along an axis Y perpendicular to the axis X; AX and AY can take positive or negative values, respectively.
- if the product AX*AY is positive, the right wheel Wri is selected as the slow wheel (W slow=Wri) (step 64),
- if the product AX*AY is negative, the left wheel Wle is selected as the slow wheel (W slow=Wle) (step 66), FIG. 5 shows a table for selecting the slow wheel in the method according to the invention when there is a slope and/or slant;

While traveling over the terrain, the signs for slope AX and slant AY can change. A change in the sign can lead to a change in the selection of the slow wheel; the selection can be conditioned by priorities.

In order of increasing priority, a change in the wheel is possible only if:
1/the sign of the product (AX*AY) is reversed.
2/the wheel stability criterion is not met.

The wheel stability criterion is estimated over a time period T as follows:

a) if the slow wheel speed=the fast wheel speed, then the ground is hard; thus a reversal in the selection of the slow wheel is authorized.

b) if the slow wheel speed<the fast wheel speed, then the ground is soft, and thus a reversal in wheel selection is not authorized.

c) if the vehicle speed=0 and T1=T in ms and the slow wheel is stable, then there is a change in selected wheel.

The wheel stability criterion can also be determined as follows:

d) if the speed of the slow wheel is equal to the speed of the fast wheel for a certain time depending on the slope, then the ground is allowing torque transfer, and the selection of the slow wheel is reversed, e) if both the slow wheel and fast wheel speeds are at their speed settings for a certain time depending on the slope, then the ground does not provide traction, and there is a change in selected wheel, f) if the vehicle speed is equal to 0 for a time greater than a preset value in seconds, then a change in selected wheel is required.

Figure 6:
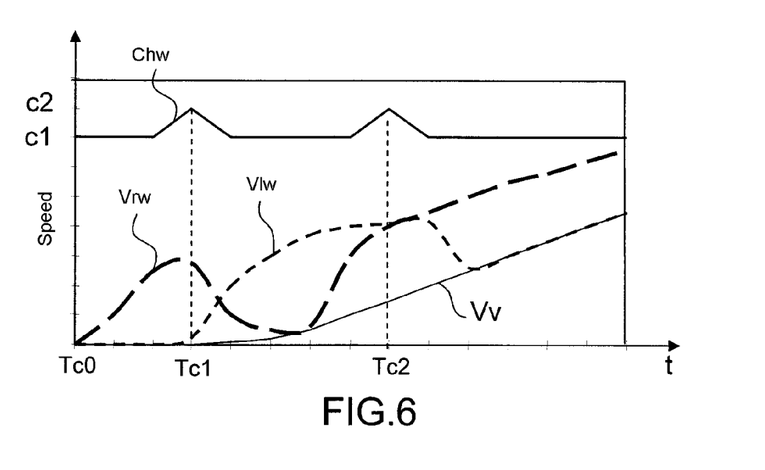
FIG. 6 shows an example of the change over time in wheel speed variation, along with the vehicle speed, during a change in selected wheel.

FIG. 6 shows an example of the change over time in wheel speed variation as well as the vehicle speed during a change in selected wheel (Phase 1).

Between an initial time Tc0 and a following time Tc1, the right wheel speed Vrw increases, the left wheel speed Vlw remains stable and less than the right wheel speed, and the vehicle speed is zero.

At time Tc1, a change in the wheel is authorized, shown in FIG. 6 by the indicator Chw changing from c1 to c2, and then returning to c1. The right wheel speed Vrw decreases while the left wheel speed Vlw increases. The vehicle speed Vv begins to increase.

At the next time Tc2, with the wheel speeds equalizing, the wheel is again changed, shown by the indicator Chw changing again from c1 to c2, then back to c1. The vehicle speed Vv continues to increase toward a value that the driver wants.

Figure 7:
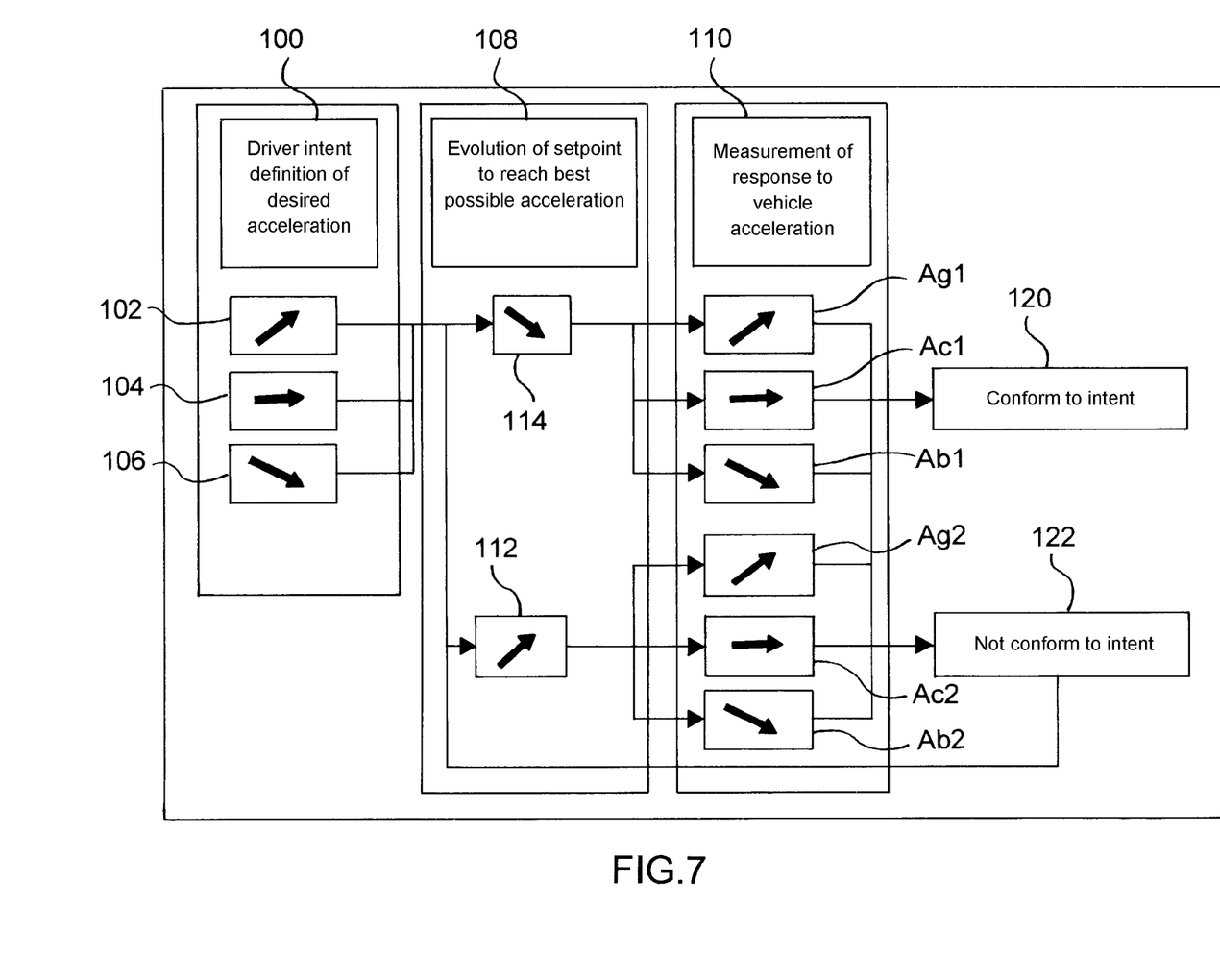
FIG. 7 shows a block diagram showing various steps in phase 3 of the method according to the invention.

FIG. 7 shows a block diagram showing the various steps in phase 3 of the method according to the invention.

In a step 100, the method takes the driver's intention 100 into account by defining the desired acceleration, and in this step:

the driver accelerates 102, maintains acceleration 104, or decelerates 106;

In a step 108, the method makes the speed setting change in order to reach the best possible acceleration, either increasing the setting 112 or decreasing the setting 114.

The best possible acceleration means an optimized acceleration corresponding to a compromise between the driver's intention and the state of the vehicle.

In a step 110, the method measures the vehicle acceleration response according to whether the setting decreases 114 or increases 112, and the response is an acceleration increase Ag1 or Ag2, a constant acceleration Ac1 or Ac2, or an acceleration decrease Ab1 or Ab2.

In step 120, the vehicle acceleration response measurement matches the driver's intention.

In step 122, if the vehicle acceleration response measurement does not match the driver's intention, the method changes the value of the setting 112, 114 to obtain the desired acceleration response.

The results obtained by a vehicle equipped with the device according to the invention in various scenarios are:

1/In a Start-Off Situation:
 on low adhesion, a continuous pursuit of motive power (Phase 1). The vehicle remains controllable due to the strategy of selecting which drive wheel to brake as a function of the steering wheel angle (turning angle), the slope and/or the slant.
 on high adhesion, no more engine cut-out.

2/During Travel:
 On low adhesion, significant motive power and steering capability. No more sense of frustration.
 In mud, a continuous pursuit of motive power.

It should be noted that although the invention has been described primarily in terms of a device that acts to brake the drive wheels (brake force distributor); another type of device, in particular a differential-type device controlled for torque distribution to the vehicle drive wheels, also falls within the field of application of the present invention.

The invention claimed is:

1. Anti-slip device for the drive wheels of a vehicle, in particular a motor vehicle, comprising:
an active braking device for the drive wheels;
a torque regulator that provides a control signal to the active braking device as a function of information on regulation deviations with respect to a specified wheel speed regulation setting, wherein the wheel speed regulation setting defines wheel speed settings corresponding to equal wheel adhesion;
a control unit that provides the torque regulator with a regulation initialization information;
wherein the control unit provides the regulation initialization information based on all-terrain travel parameters for the vehicle, including adhesion and drive wheel speed, terrain slope and/or; slant, and information about action taken by the driver on one or more vehicle control elements,
wherein, in at least one operation phase of the vehicle, the torque regulator (i) selects a first drive wheel to brake, referred to as slow wheel, and regulates a speed of the slow wheel near a first wheel speed lower than the wheel speed regulation setting in order to obtain motive power, while (ii) simultaneously letting at least one other drive wheel participating in the traction of the vehicle not braked so that a speed of said at least one other drive wheel increases above the wheel speed regulation setting in order to increase road adhesion of said at least one other drive wheel.

2. Anti-slip device according to claim 1, wherein the first drive wheel, which is braked, and the at least one other drive wheel, which is unbraked, are respectively located at the free ends of a same axle.

3. Anti-slip device according to claim 1, wherein the first drive wheel, which is braked, and the at least one other drive wheel, which is unbraked, are steered wheels.

4. Anti-slip device according to claim 1, wherein the torque regulator determines the best possible acceleration as a function of vehicle travel parameters and information about driver action on one or more vehicle control elements.

5. Method of avoiding slippage of wheels of a vehicle, wherein the vehicle comprises a torque regulator that provides a control signal to an active braking device of drive wheels of the vehicle as a function of information on regulation deviations with respect to a specified wheel speed regulation setting, wherein the wheel speed regulation setting defines wheel speed settings corresponding to equal wheel adhesion, wherein the method includes the following steps:
providing a control signal to the torque regulator of the active braking device as a function of information on regulation deviations with respect to the wheel speed regulation setting; and
providing a regulation initialization information to the torque regulator based on parameters for vehicle travel on the ground, including adhesion and wheel speed, terrain slope and/or slant, and information about action taken by the driver on vehicle control elements,
in at least one operation phase of the vehicle:
selecting a first drive wheel to brake, referred to as slow wheel, and regulating a speed of the first drive wheel near a first wheel speed lower than the wheel speed regulation setting in order to have drive power, while
simultaneously letting at least one other drive wheel that participates in traction unbraked so that a speed of said at least one other drive wheel increases above the wheel speed regulation setting in order to eject foreign bodies reducing the adhesion of said at least one other drive wheel and use the rotational speed of said at least one other drive wheel to dig into the ground and reestablish adhesion.

6. Method according to claim 5, which comprises at least:
in an analysis/evaluation phase (Phase 0), analyzing/detecting adhesion and wheel speed, slope and/or slant, and driver intentions;
in a vehicle start phase (Phase 1):
selecting the first drive wheel to brake, referred to as slow wheel, and regulating the speed of the first drive wheel near the first wheel speed lower than the wheel speed regulation setting in order to have drive power, while
simultaneously letting the at least one other drive wheel that participates in traction unbraked so that the speed of said at least one other drive wheel increases above the wheel speed regulation setting in order to eject foreign bodies reducing the adhesion of said at least one other drive wheel and use the rotational speed of said at least one other drive wheel to dig into the ground and reestablish adhesion;

in a travel phase (Phase 3):
decreasing the wheel speed regulation setting, in order to find the best possible acceleration for the vehicle, and determining a target acceleration the driver wants for the vehicle, and regulating the speeds of the first drive wheel and of the at least one other drive wheel near the wheel speed regulation setting so that an acceleration of the vehicle is near said acceleration.

7. Method according to claim 5, wherein in the absence of any slope and/or slant and when the wheels are straight or at a turning angle less than a preset value, the wheel with the lowest speed is selected as the slow wheel in the initialization phase.

8. Method according to claim 5, wherein in the absence of any slope and/or slant, when the wheels are turned to at least a certain turning angle, the outer wheel is selected as the slow wheel in order to avoid generating more understeer, the outer wheel being the wheel furthest from the theoretical pivot point of the vehicle.

9. Method according to claim 5, wherein in the presence of a slope and/or slant, with AX as longitudinal acceleration along a longitudinal axis X of the vehicle and AY as acceleration along an axis Y perpendicular to the axis X, with AX and AY able to take positive or negative values, the method has a step for calculating the sign of the product AX*AY and determining the slow wheel:
if the product AX*AY is positive, the right wheel (Wri) is selected as the slow wheel (W slow=Wri) (64),
if the product AX*AY is negative, the left wheel (Wle) is selected as the slow wheel (W slow=Wle) (66),
wherein a change in the selection of the slow wheel is possible only when:
the sign of the product (AX*AY) reverses, or
a wheel stability criterion is not met.

10. Method according to claim 9, wherein the wheel stability criterion is estimated over a time period T as follows:
a) when the slow wheel speed=the fast wheel speed, then the ground is allowing torque transfer, so a reversal in the selection of the slow wheel is authorized,
b) when the slow wheel speed<the fast wheel speed, then the ground does not provide traction, so a reversal in wheel selection is not authorized,
c) when the vehicle speed=0 and T1=T in ms and the slow wheel is stable, there is a change in selected wheel.

11. Method according to claim 9, wherein the wheel stability criterion is determined as follows:
d) when the speed of the slow wheel is equal to the speed of the fast wheel for a certain time depending on the slope, then the ground is allowing torque transfer, and the selection of the slow wheel is reversed,
e) when both the slow wheel and fast wheel speeds are at their speed settings for a certain time depending on the slope, then the ground does not provide traction, and there is a change in selected wheel,
f) when the vehicle speed is equal to 0 for a time greater than a preset value in seconds, then a change in selected wheel is required.

12. Anti-slip device according to claim 1, wherein:
in an analysis/evaluation phase (Phase 0), the device analyses/detects adhesion and wheel speed, slope and/or slant, and driver intentions;

in a vehicle start phase (Phase 1):
the torque regulator selects the first drive wheel to slow down, referred to as slow wheel, and regulates the speed of the first drive wheel near the first wheel speed lower than the wheel speed regulation setting in order to have drive power, while
simultaneously letting at least one other drive wheel that participates in traction unbraked so that the speed of said at least one other drive wheel increases above the wheel speed regulation setting in order to eject foreign bodies reducing the adhesion of said at least one other drive wheel and use the rotational speed of said at least one other drive wheel to dig into the ground and reestablish adhesion;

in a travel phase (Phase 3):
the wheel speed regulation setting is decreased, in order to find the best possible acceleration for the vehicle, and
a target acceleration the driver wants for the vehicle is determined, and the speeds of the first drive wheel and of the at least one other drive wheel are regulated near the wheel speed regulation setting so that an acceleration of the vehicle is near said acceleration.

13. Anti-slip device for the drive wheels of a vehicle, in particular a motor vehicle, comprising:
a drive torque regulator that distributes a drive torque among drive wheels of the vehicle as a function of information on regulation deviations with respect to a specified wheel speed regulation setting, wherein the wheel speed regulation setting defines wheel speed settings corresponding to equal wheel adhesion;
a control unit that provides the drive torque regulator with a regulation initialization information;
wherein the control unit provides the regulation initialization information based on all-terrain travel parameters for the vehicle, including adhesion and drive wheel speed, terrain slope and/or slant, and information about action taken by the driver on one or more vehicle control elements,
wherein, in at least one operation phase of the vehicle, the drive torque regulator (i) selects a first drive wheel to slow down, referred to as slow wheel, and regulates a speed of the slow wheel near a first wheel speed lower than the wheel speed regulation setting in order to obtain motive power, while (ii) simultaneously regulating a speed of at least one other drive wheel participating in the traction of the vehicle so that the speed of said at least one other drive wheel increases above the wheel speed regulation setting in order to increase road adhesion of said at least one other drive wheel.

14. Method of avoiding slippage of wheels of a vehicle, wherein the vehicle comprises a drive torque distributor that distributes a drive torque among drive wheels of the vehicle as a function of information on regulation deviations with respect to a specified wheel speed regulation setting, wherein the wheel speed regulation setting defines wheel speed settings corresponding to equal wheel adhesion, wherein the method includes the following steps:
providing a control signal to the drive torque distributor of the vehicle as a function of information on regulation deviations with respect to the wheel speed regulation setting; and
providing a regulation initialization information to the drive torque distributor based on parameters for vehicle travel on the ground, including adhesion and wheel speed, terrain slope and/or slant, and information about action taken by the driver on vehicle control elements, during at least one operation phase of the vehicle:
selecting a first drive wheel to slow down, referred to as slow wheel, and regulating a speed of the first drive wheel near a first wheel speed lower than the wheel speed regulation setting in order to have drive power, while
simultaneously regulating a speed at least one other drive wheel that participates in traction so that the speed of said at least one other drive wheel increases above the wheel speed regulation setting in order to eject foreign bodies reducing the adhesion of said at least one other drive wheel and use the rotational speed of said at least one other drive wheel to dig into the ground and reestablish adhesion.

* * * * *